United States Patent
Zettel et al.

(10) Patent No.: US 8,634,985 B2
(45) Date of Patent: Jan. 21, 2014

(54) METHOD OF DETECTING AN IN-RANGE FAILURE OF A BRAKE PEDAL POSITION SENSOR

(75) Inventors: Andrew M. Zettel, Ann Arbor, MI (US); John F. Van Gilder, Webberville, MI (US); Ammar A Atmeh, Ann Arbor, MI (US); Stanley D Sullivan, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 162 days.

(21) Appl. No.: 13/010,844

(22) Filed: Jan. 21, 2011

(65) Prior Publication Data

US 2012/0191295 A1   Jul. 26, 2012

(51) Int. Cl.
*G06F 19/00* (2011.01)
*B60T 8/88* (2006.01)
*B60T 7/04* (2006.01)
*G05G 1/38* (2008.04)

(52) U.S. Cl.
CPC . *B60T 7/042* (2013.01); *G05G 1/38* (2013.01); *B60W 2540/12* (2013.01)
USPC ....... 701/31.7; 701/29.1; 701/29.2; 701/29.9; 701/30.3; 701/30.5; 701/31.3; 701/31.9; 701/32.1; 701/33.5; 701/33.7; 303/113.4; 303/122.03; 303/122.04; 303/122.05

(58) Field of Classification Search
CPC ...... G05G 1/38; B60T 7/042; B60W 2540/12
USPC ............... 701/1, 29.1, 29.2, 29.3–31.3, 31.7, 701/31.9, 32.1, 33.4, 33.5, 33.7–34.1, 34.4, 701/33.7–34; 303/113.4, 112.03–112.05
See application file for complete search history.

(56) References Cited

U.S. PATENT DOCUMENTS

| | | | |
|---|---|---|---|
| 6,405,117 B1 * | 6/2002 | Walenty et al. | 701/70 |
| 2002/0019688 A1 * | 2/2002 | Mantini et al. | 701/29 |
| 2005/0131613 A1 * | 6/2005 | Bohm et al. | 701/71 |
| 2010/0228430 A1 * | 9/2010 | Cahill | 701/34 |
| 2011/0271736 A1 * | 11/2011 | Dang Van Nhan | 73/1.79 |

FOREIGN PATENT DOCUMENTS

DE             19920851 A1      5/2000

* cited by examiner

*Primary Examiner* — John Q Nguyen
*Assistant Examiner* — Chuong Nguyen
(74) *Attorney, Agent, or Firm* — Quinn Law Group, PLLC

(57) ABSTRACT

A method of detecting an in-range failure of a brake pedal position sensor includes calculating the difference between a minimum position and a maximum position of the brake pedal position sensor. The calculated difference is weighted to define a fast test weighted input value and/or a full test weighted input value. A cumulative test result value is incremented by the fast test weighted input value and/or the full test weighted input value. The cumulative test result value is filtered to define a moving average of the cumulative test result value after each incremented occurrence. The moving average of the cumulative test result value is tracked to determine if the brake pedal position sensor is functioning properly.

19 Claims, 2 Drawing Sheets

METHOD OF DETECTING AN IN-RANGE FAILURE OF A BRAKE PEDAL POSITION SENSOR

TECHNICAL FIELD

The invention generally relates to a method of detecting an in-range failure of a brake pedal position sensor.

BACKGROUND

A brake pedal position sensor senses a position of a brake pedal and sends an electrical signal to an engine control module indicating the current position of the brake pedal. The electrical signal varies within a normal operating range with the change in position of the brake pedal. The electrical signal may be defined as operating in-range when the electrical signal is within the normal operating range.

The engine control module includes onboard diagnostics that continually monitor the electrical signal from the brake pedal position sensor. When the electrical signal from the brake pedal position sensor is out of the normal operating range, i.e., out of range, the onboard diagnostics may easily determine that the brake pedal position sensor is not functioning properly. However, the electrical signal from the brake pedal position sensor may be shorted in such a manner so as to provide a continuous and steady signal to the engine control module that is within the normal operating range, i.e., in-range. Accordingly, the onboard diagnostics are unable to detect that the brake pedal position sensor is not functioning properly because the electrical signal is in-range.

Some vehicles may employ an erratic sensor diagnostic system. The erratic sensor diagnostic system detects a fluctuating electrical signal from the brake pedal position sensor that would not be possible when actuated by an operator's foot. However, as noted above, if the electrical signal form the brake pedal position sensor is shorted in such a manner as to provide a continuous and steady electrical signal, the erratic sensor diagnostic system is unable to identify the malfunctioning brake pedal position sensor. Another method of detecting in-range brake pedal position sensor failures includes comparing the signal from the brake pedal position sensor to a signal from a second or redundant sensor that is designed to correlate with the brake pedal position sensor. However, such redundancy, i.e., a second redundant brake pedal position sensor, is not always available.

SUMMARY

A method of detecting an in-range failure of a brake pedal position sensor for a vehicle is provided. The method includes initializing a full test buffer, and incrementing a full test buffer counter when the full test buffer is initialized to track a total number of instances the full test buffer is initialized. A minimum position of the brake pedal position sensor and a maximum position of the brake pedal position sensor are sensed. A position difference between the sensed minimum position and the sensed maximum position of the brake pedal position sensor is calculated. The method further includes sensing a position of a brake transmission shift interlock of the vehicle, initiating a full test when the brake transmission shift interlock is disposed in a park gear, sensing a depressed position of an accelerator pedal, and sensing a speed of the vehicle. The calculated position difference is weighted to define a full test weighted input value. The calculated position difference is weighted to define the full test weighted input value when the full test counter is greater than a minimum initiated full test value, the brake transmission shift interlock is moved out of the park gear, the speed of the vehicle is less than a pre-defined vehicle speed threshold and the depressed position of the accelerator pedal is less than a pre-defined accelerator pedal position. A cumulative test result value is incremented by the full test weighted input value. The cumulative test result value is filtered to define a moving average of the cumulative test results. The method further includes tracking the moving average of the cumulative test results to determine if the brake pedal position sensor is functioning properly.

A method of detecting an in-range failure of a brake pedal position sensor for a vehicle is also provided. The method includes initializing a fast test buffer, and incrementing a fast test buffer counter when the fast test buffer is initialized to track a total number of instances the fast test buffer is initialized. A full test buffer is incremented when the full test buffer is initialized to track a total number of instances the full test buffer is initialized. The method further includes sensing a minimum position of the brake pedal position sensor, sensing a maximum position of the brake pedal position sensor and calculating a position difference between the sensed minimum position and the sensed maximum position of the brake pedal position sensor. The calculated position difference is weighted to define a fast test weighted input value when the fast test buffer counter is greater than a minimum initialized fast test value, and incrementing a cumulative test result value by the fast test weighted input value. The method further includes sensing a position of a brake transmission shift interlock of the vehicle, initiating a full test when the brake transmission shift interlock is disposed in a park gear, sensing a depressed position of an accelerator pedal, and sensing a speed of the vehicle. The calculated position difference is weighted to define a full test weighted input value when the full test counter is greater than a minimum initiated full test value, the brake transmission shift interlock is moved out of the park gear, the speed of the vehicle is less than a pre-defined vehicle speed threshold and the depressed position of the accelerator pedal is less than a pre-defined accelerator pedal position. The method further includes incrementing the cumulative test result value by the full test weighted input value, and filtering the cumulative test result value to define a moving average of the cumulative test results. The moving average of the cumulative test results is tracked to determine if the brake pedal position sensor is functioning properly.

Accordingly, the change in position of the brake pedal position sensor is tracked to identify an in-range failure of the brake pedal position sensor. Accordingly, if the brake pedal position sensor is not moving, the moving average of the cumulative test results will tend toward a value that indicates that the brake pedal position sensor is not moving, thereby allowing onboard diagnostics to identify a brake pedal position sensor that is not functioning properly yet still providing an in-range signal.

The above features and advantages and other features and advantages of the present invention are readily apparent from the following detailed description of the best modes for carrying out the invention when taken in connection with the accompanying drawings.

DETAILED DESCRIPTION

Figure 1:
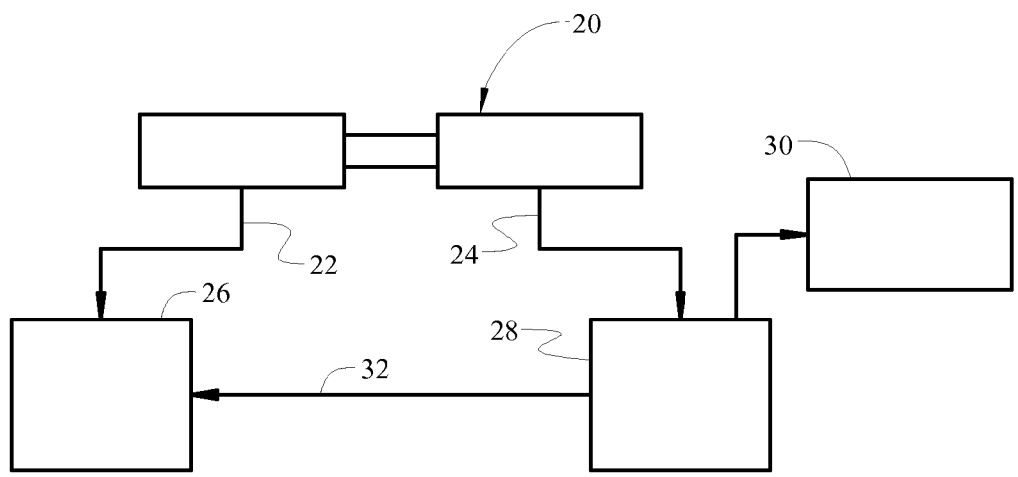
FIG. 1 is a schematic signal flow path of a brake pedal position sensor.

Referring to the Figures, wherein like numerals indicate like parts throughout the several views, a brake pedal position sensor is generally shown at 20 in FIG. 1. Referring to FIG. 1, the brake pedal position sensor 20 is configured for sensing a position of a brake pedal (not shown) of a vehicle (not shown). The brake pedal position sensor 20 generates an electrical signal with varying strength with movement of the brake pedal. Accordingly, the signal from the brake pedal position sensor 20 changes in relation to a change in position of the brake pedal.

The brake pedal position sensor 20 may include any brake pedal position sensor 20 capable of generating a first signal 22 and a second signal 24, wherein each of the first signal 22 and the second signal 24 indicate the position of the brake pedal. The first signal 22 is directed to a controller 26. The controller 26 may include but is not limited to an engine control module or a brake control processor. The controller 26 includes onboard diagnostics that utilize the first signal 22 to test and/or monitor the brake pedal position sensor 20 for proper functionality.

The second signal 24 is directed to a brake control module 28. The brake control module 28 releases a Brake Transmission Shift Interlock 30 (BTSI) when the second signal 24 indicates that the brake pedal is depressed. Once the brake transmission shift interlock 30 is released, the transmission may be moved out of a park gear. Accordingly, brake control module 28 must receive the second signal 24 from the brake pedal position sensor 20 indicating that the brake is depressed in order for the brake control module 28 to release the brake transmission shift interlock 30 to allow the transmission to be shifted out of the park gear and into another gear, including but not limited to a reverse gear, a drive gear or a neutral gear.

The brake control module 28 sends a BTSI signal 32 to the controller 26 indicating that the brake transmission shift interlock 30 has been released, i.e., that the brake transmission shift interlock 30 has moved out of the park gear and into another gear. The release of the brake transmission shift interlock 30 may be interpreted by the controller 26 to indicate that the brake pedal position sensor 20 is functioning properly because the brake transmission shift interlock 30 may only be released in response to the second signal 24, which indicates that the brake pedal position sensor 20 has sensed movement of the brake pedal and so indicated the movement of the brake pedal to the brake control module 28.

Figure 2:
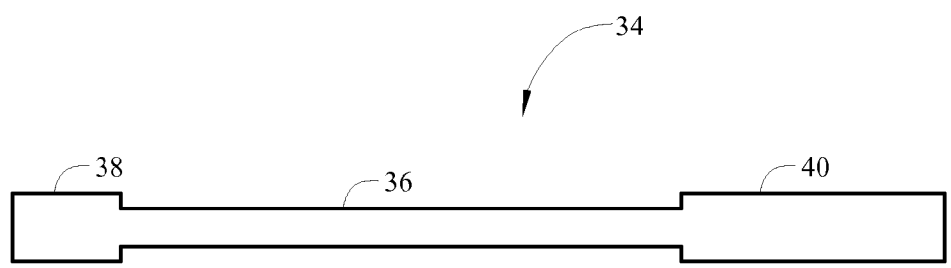
FIG. 2 is a schematic signal strength diagram of the brake pedal position sensor.

Referring to FIGS. 1 and 2, the first signal 22 and the second signal 24 from the brake pedal position sensor 20, hereinafter referred to as the sensor signals 22, 24, include an electrical sensor signal having a variable resistance, generally indicated at 34. The level of resistance of the sensor signals 22, 24 indicates and is related to the relative position of the brake pedal. The level of resistance of the sensor signals 22, 24 falls within a normal operating range 36. When the level of resistance of the sensor signals 22, 24 is within the normal operating range 36, the brake pedal position sensor 20 may be defined as operating in-range. When the level of resistance of the sensor signals 22, 24 is not with in the normal operating range 36, the brake pedal position sensor 20 may be defined as operating out of range. More specifically, if the level of resistance of the sensor signals 22, 24 is below the normal operating range 36, the sensor signals 22, 24 may be defined as operating out of range low, generally indicated at 38. Similarly, if the level of resistance of the sensor signals 22, 24 is above the normal operating range 36, the sensor signals 22, 24 may be defined as operating out of range high, generally indicated at 40. The onboard diagnostics may determine that the brake pedal position sensor 20 is not functioning properly when the level of resistance of the sensor signals 22, 24 is operating out of range low 38 or out of range high 40.

Figure 3:
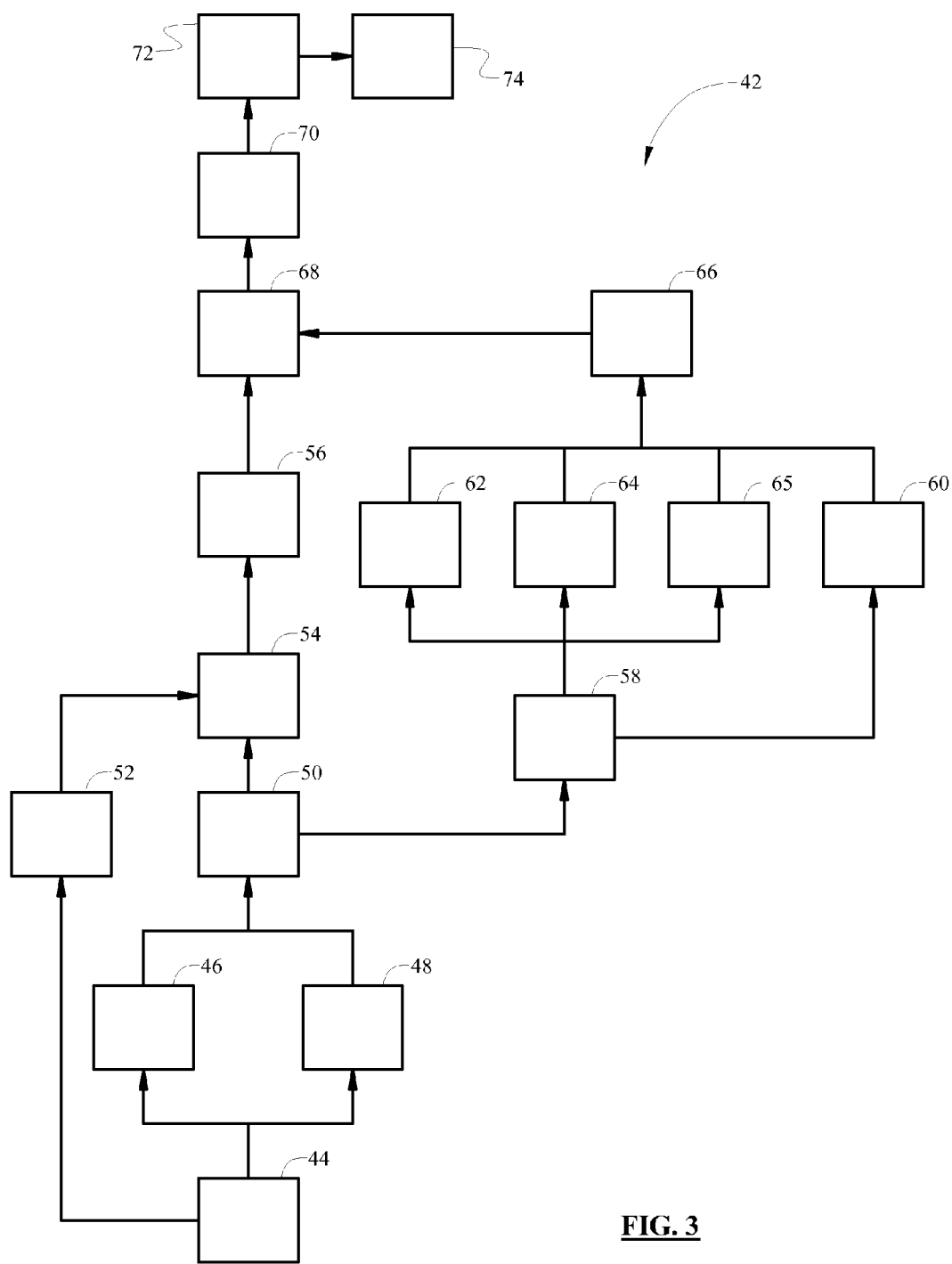
FIG. 3 is a flow chart showing a method of detecting an in-range failure of the brake pedal position sensor.

In order to determine when the brake pedal position sensor 20 is not functioning properly when the sensor signals 22, 24 are operating in-range, i.e., not operating out of range low 38 or out of range high 40, a method of detecting an in-range failure of the brake pedal position sensor 20 is provided. The method is shown generally at 42 in FIG. 3. The method 42 may be embodied as an algorithm operable by the controller 26.

The method 42 includes initializing a fast test buffer, indicated at 44. The fast test buffer initializes each time the controller 26 is turned on, i.e., each time the vehicle is turned on. Initializing the fast test buffer allocates memory in the controller 26 for receiving and temporarily storing data related to the operation of the brake pedal position sensor 20. The data related to the operation of the brake pedal position sensor 20 is utilized by the controller 26 to analyze the operation of the brake pedal position sensor 20. The data related to the operation of the brake pedal position sensor 20 that is stored in the fast test buffer may include but is not related to a first position of the brake pedal, hereinafter referred to as a minimum position of the brake pedal, and a second position of the brake pedal, hereinafter referred to as a maximum position of the brake pedal. The controller 26 may calculate a position difference between the minimum position and the maximum position of the brake pedal, and store the position difference in the fast test buffer as well.

The method 42 further includes sensing a minimum position of the brake pedal position sensor 20, indicated at 46, and sensing a maximum position of the brake pedal position sensor 20, indicated at 48. The minimum position and the maximum position of the brake pedal are sensed by the brake pedal position sensor 20 and provided to the controller 26 through the first signal 22. The controller 26 may receive the first signal 22 and interpret the minimum position and the maximum position of the brake pedal from the varied level of resistance of the first signal 22. As indicated above, the minimum position and the maximum position of the brake pedal are stored in the fast test buffer.

The method 42 further includes calculating a position difference between the sensed minimum position and the sensed maximum position of the brake pedal position sensor 20, indicated at 50. The controller 26 may calculate the position difference by subtracting the minimum position of the brake pedal from the maximum position of the brake pedal. The position difference may be calculated as percentage of the total possible movement of the brake pedal. Accordingly, if the maximum position is equal to a position associated with a relative movement of the brake pedal equal to forty percent (40%) of the total range of motion of the brake pedal, and the minimum position is equal to a position associated with a relative movement of the brake pedal equal to fifteen percent (15%) of the total range of motion of the brake pedal, then the position difference would be equal to forty percent (40%) minus fifteen percent (15%), or twenty five percent (25%) of the total range of movement of the brake pedal.

The method 42 may further include incrementing a fast test buffer counter, indicated at 52, when the fast test buffer is initialized. The fast test buffer counter is used to track a total number of instances the fast test buffer is initialized. Accordingly, the fast test buffer counter initially starts at zero (0) and increments by one (1) every time the fast test buffer is initialized. Therefore, if the fast test buffer has been initialized one hundred seventy four (174) times, then the fast test buffer counter would equal one hundred seventy four (174). As indicated above, the position difference of the brake pedal is stored in the fast test buffer.

The method 42 further includes weighting the calculated position difference to define a fast test weighted input value, indicated at 54. The position difference is weighted to define the fast test weighted input value when the fast test buffer counter is greater than a minimum initialized fast test value. Accordingly, the vehicle is allowed to cycle on and off, i.e., the vehicle may be turned on and off, a minimum number of occurrences equal to the minimum initialized fast test value before the fast test algorithm begins to track the operation of the brake pedal position sensor 20. This operates to ensure that the fast test algorithm is not operating to test the brake pedal position sensor 20 prior to all of the components of the vehicle being installed and/or tested. Once the fast test buffer counter is greater than the minimum initialized fast test value, then the fast test algorithm may continue to test and/or monitor the brake pedal position sensor 20.

Weighting the calculated position difference to define a fast test weighted input value may include referencing a fast test look-up table, which converts the calculated position difference to the fast test weighted input value. For example, a calculated position difference having a higher value, indicating greater movement between the sensed minimum position and the sensed maximum position of the brake pedal, may be weighted higher than a calculated position difference having a lower value, indicated less movement between the sensed minimum position and the sensed maximum position of the brake pedal. The larger values of the calculated position difference may be weighted more heavily than the smaller values of the calculated position difference because the larger values of the calculate position difference provide better evidence that the brake pedal position sensor 20 is not stuck at a constant resistance, i.e., that the electrical signal is not stuck on a constant value such as when the wiring is shorted to a fixed resistance. In other words, the greater the calculated difference, the more likely the brake pedal position sensor 20 is not stuck at a fixed electrical resistance.

The method 42 further includes incrementing a cumulative test result value by the fast test weighted input value, indicated at 56. The cumulative test result value is the ongoing summation of all test result values. Accordingly, each time the fast test algorithm calculates a fast test weighted input value, that fast test weighted input value is added to the previous cumulative test result value to define a current cumulative test result value.

The method 42 further includes initializing a full test buffer, indicated at 58. The full test buffer initializes each time the controller 26 is turned on and the fast test algorithm completes to define a fast test weighted input value. Initializing the full test buffer allocates memory in the controller 26 for receiving and temporarily storing data related to the operation of the brake pedal position sensor 20. The data related to the operation of the brake pedal position sensor 20 is utilized by the controller 26 to analyze the operation of the brake pedal position sensor 20. The data related to the operation of the brake pedal position sensor 20 that is stored in the full test buffer may include but is not related to the minimum position of the brake pedal, the maximum position of the brake pedal and the calculated difference between the minimum position and the maximum position of the brake pedal.

The method 42 may further include incrementing a full test buffer counter when the full test buffer is initialized, indicated at 60. The full test buffer counter is used to track a total number of instances the full test buffer is initialized. Accordingly, the full test buffer counter initially starts at zero (0) and increments by one (1) every time the full test buffer is initialized. Therefore, if the full test buffer has been initialized one hundred twenty two (122) times, then the full test buffer counter would equal one hundred twenty two (122).

The method 42 includes sensing a position of a brake transmission shift interlock 30 of the vehicle, indicated at 62. The position of the brake transmission shift interlock 30 may be sensed by the brake control module 28 through the second signal 24 of the brake pedal position sensor 20, and signaled to the controller 26. Accordingly, the controller 26 indirectly utilizes the second signal 24 from the brake pedal position sensor 20 by identifying when the brake control module 28 has released the brake transmission shift interlock 30, which requires an indication form the second signal 24 that the brake pedal is depressed, i.e., an indication of movement of the brake pedal position sensor 20.

The method 42 further includes initiating the full test algorithm when the brake transmission shift interlock 30 is disposed in a park gear, i.e., when the brake control module 28 has not yet released the brake transmission shift interlock 30. This ensures that the vehicle is not being started from a neutral transmission gear. Initiating the full test algorithm when the brake transmission shift interlock 30 is disposed in a park gear may occur only once during a vehicle on cycle. The vehicle on cycle is defined as the cycle beginning when the vehicle is turned on and ending when the vehicle is turned off.

In order to identify two footed acceleration of the vehicle, i.e., depressing an accelerator pedal while simultaneously pressing the brake pedal, the method 42 further includes sensing a depressed position of the accelerator pedal, indicated at 64, and sensing a speed of the vehicle, indicated at 65. The full test algorithm may only continue if the position of the accelerator pedal is less than a pre-defined accelerator pedal position, and the speed of the vehicle is less than a pre-defined vehicle speed threshold.

The method 42 further includes weighting the calculated position difference to define a full test weighted input value, indicated at 66. The calculated position difference is weighted to define the full test weighted input value when the full test counter is greater than a minimum initiated full test value, the brake transmission shift interlock 30 is moved out of the park gear, the speed of the vehicle is less than the pre-defined vehicle speed threshold and the depressed position of the accelerator pedal is less than the pre-defined accelerator pedal position. Accordingly, the controller 26 is allowed to cycle on and off, i.e., the controller 26 may be turned on and off, a minimum number of occurrences equal to the minimum initialized full test value before the full test algorithm begins to track the operation of the brake pedal position sensor 20. This provides sufficient data for the buffer in the controller 26 to accurately track the operation of the brake pedal position sensor 20, as well as requires a minimum number of complete tests for the exponentially weighted moving average, described below. Additionally, this operates to ensure that the full test algorithm is not operating to test the brake pedal position sensor 20 prior to all of the components of the vehicle being installed and/or tested. Additionally, the full test algorithm may only continue when the brake transmission shift interlock 30 is released and the transmission is moved out of the park gear and into another gear, thereby providing additional indication that the brake pedal position sensor 20 has moved.

Weighting the calculated position difference to define a full test weighted input value may include referencing a full test look-up table, which converts the calculated position difference to the full test weighted input value. For example, a calculated position difference having a higher value, indicating greater movement between the sensed minimum position and the sensed maximum position of the brake pedal, may be weighted higher than a calculated position difference having a lower value, indicated less movement between the sensed minimum position and the sensed maximum position of the brake pedal. The larger values of the calculated position difference may be weighted more heavily than the smaller values of the calculated position difference because the larger values of the calculate position difference provide better evidence that the brake pedal position sensor 20 is not stuck at a constant resistance, i.e., is not free to move. In other words, the greater the calculated difference, the more likely the brake pedal position sensor 20 is free to move.

The method 42 further includes incrementing the cumulative test result value by the full test weighted input value, indicated at 68. The cumulative test result value is the ongoing summation of all test result values, i.e., both the fast test result values and the full test result values. Accordingly, each time the full test algorithm calculates a full test weighted input value, that full test weighted input value is added to the previous cumulative test result value to re-define the current cumulative test result value.

The method 42 further includes filtering the cumulative test result value to define a moving average of the cumulative test results, indicated at 70. The cumulative rest result value may be filtered with either a first order lag filter or an Exponential Weighted Moving Average (EWMA) filter. Accordingly, an average value for each incremented cumulative test result value is calculated, and a plot line connecting all of the averages is the moving average. As such, filtering the cumulative test result value is an ongoing analysis that provides an indication or trend line of whether the brake pedal position sensor 20 is moving or is stuck in place at a constant in-range resistance.

Therefore, the method 42 further includes tracking the moving average of the cumulative test results to determine if the brake pedal position sensor 20 is functioning properly. The method 42 may further include signaling that the brake pedal position sensor 20 is functioning properly when the moving average of the weighted input is greater than a passing level, signaling that the brake pedal position sensor 20 is not functioning properly when the moving average of the weighted input is less than a failing level, or signaling that proper functionality of the brake pedal position sensor 20 is undeterminable when the moving average of the weighted input is less than a passing level and greater than a failing level.

As noted above, the moving average of the cumulative test result value provides an indication of whether the brake pedal position sensor 20 is moving or is stuck in place and sending a constant signal at a resistance within the normal operation range of the brake pedal position sensor 20. If the moving average of the cumulative test result value trends upward, i.e., trends toward larger values, then the moving cumulative test result value indicates that the brake pedal position sensor 20 is freely moving. Alternatively, if the moving average of the cumulative test result value trends downward, i.e., trends toward smaller values, then the moving cumulative test result value indicates that the brake pedal position sensor 20 may not be freely moving. Accordingly, even if the moving average of the cumulative test result value falls between the passing level and the failing level, thereby preventing the controller 26 from determining if the brake pedal position sensor 20 is functioning properly or is not functioning properly, review of the plot line of the moving average may give an indication of the performance of the brake pedal position sensor 20. For example, a recently repaired brake pedal position sensor 20 would trend upwardly, whereas a recently failed brake pedal position sensor 20 would trend downward.

The method 42 further includes incrementing a sample counter for the cumulative test result value, indicated at 72. The sample counter for the cumulative test result values is used to track a number of instances the cumulative test result value has been incremented. Accordingly, the sample counter for the cumulative test result value increases by one (1) every time the cumulative test result value is incremented. Therefore, if the cumulative test result value has been incremented fifty five times (55), then the sample counter for the cumulative test result value is equal to fifty five (55).

The method 42 further includes calibrating the cumulative test result value to a pre-defined starting value of the cumulative test result value, indicated at 74, when the sample counter for the cumulative test result value reaches a maximum limit. The maximum limit of the sample counter for the cumulative test result value is the total number of times the cumulative test result value may be incremented within a cycle. Upon reaching the maximum limit, the controller 26 resets the sample counter for the cumulative test result value to zero, and resets the value of the cumulative test result to the pre-defined starting value. The pre-defined starting value of the cumulative test result value may be a value somewhere between the failing level and the passing level. Furthermore, the cumulative test result value and the sample counter for the cumulative test result value may also be manually reset is required for maintenance or other reasons.

While the best modes for carrying out the invention have been described in detail, those familiar with the art to which this invention relates will recognize various alternative designs and embodiments for practicing the invention within the scope of the appended claims.

The invention claimed is:

1. A method of detecting an in-range failure of a brake pedal position sensor for a vehicle, the method comprising:
    initializing a full test buffer;
    incrementing a full test buffer counter when the full test buffer is initialized to track a total number of instances the full test buffer is initialized;
    sensing a first position of the brake pedal position sensor;
    sensing a second position of the brake pedal position sensor;
    calculating a position difference between the sensed first position and the sensed second position of the brake pedal position sensor;
    sensing a position of a brake transmission shift interlock of the vehicle;
    initiating a full test when the brake transmission shift interlock is disposed in a park gear;
    sensing a depressed position of an accelerator pedal;
    sensing a speed of the vehicle;
    weighting the calculated position difference to define a full test weighted input value when the full test counter is greater than a initiated full test value, the brake transmission shift interlock is moved out of the park gear, the speed of the vehicle is less than a pre-defined vehicle speed and the depressed position of the accelerator pedal is less than a pre-defined accelerator pedal position;
    incrementing a cumulative test result value by the full test weighted input value to re-define the current cumulative test result value; and tracking a moving average of the current cumulative test result value to determine if the brake pedal position sensor is functioning properly.

2. A method as set forth in claim 1 further comprising signaling that the brake pedal position sensor is functioning properly when the moving average of the weighted input is greater than a passing level.

3. A method as set forth in claim 1 further comprising signaling that the brake pedal position sensor is not functioning properly when the moving average of the weighted input is less than a failing level.

4. A method as set forth in claim 1 further comprising signaling that proper functionality of the brake pedal position sensor is undeterminable when the moving average of the weighted input is less than a passing level and greater than a failing level.

5. A method as set forth in claim 1 wherein filtering the weighted input to define a moving average of the weighted input includes filtering the weighted input with either a first order lag filter or a Exponential Weighted Moving Average (EWMA) filter.

6. A method as set forth in claim 1 wherein initiating the full test buffer when the brake transmission shift interlock is disposed in a park gear occurs only once during a vehicle on cycle.

7. A method as set forth in claim 1 further comprising incrementing a sample counter for the cumulative test result value to track a number of instances the cumulative test result value has been incremented.

8. A method as set forth in claim 7 further comprising calibrating the cumulative test result value to a pre-defined starting value of the cumulative test result value when the sample counter for the cumulative test result value reaches a limit.

9. A method as set forth in claim 1 wherein weighting the calculated position difference to define a full test weighted input value may include referencing a full test look-up table to convert the calculated position difference to the full test weighted input value.

10. A method as set forth in claim 1 further comprising initializing a fast test buffer.

11. A method as set forth in claim 10 further comprising incrementing a fast test buffer counter when the fast test buffer is initialized to track a total number of instances the fast test buffer is initialized.

12. A method as set forth in claim 11 further comprising weighting the calculated position difference to define a fast test weighted input value when the fast test buffer counter is greater than a initialized fast test value.

13. A method as set forth in claim 12 wherein weighting the calculated position difference to define a fast test weighted input value may include referencing a fast test look-up table to convert the calculated position difference to the fast test weighted input value.

14. A method as set forth in claim 12 further comprising incrementing the cumulative test result value by the fast test weighted input value.

15. A method of detecting an in-range failure of a brake pedal position sensor for a vehicle, the method comprising:

initializing a fast test buffer;
incrementing a fast test buffer counter when the fast test buffer is initialized to track a total number of instances the fast test buffer is initialized;
initializing a full test buffer;
incrementing a full test buffer counter when the full test buffer is initialized to track a total number of instances the full test buffer is initialized;
sensing a first position of the brake pedal position sensor;
sensing a second position of the brake pedal position sensor;
calculating a position difference between the sensed first position and the sensed second position of the brake pedal position sensor;
weighting the calculated position difference to define a fast test weighted input value when the fast test buffer counter is greater than a initialized fast test value;
incrementing a cumulative test result value by the fast test weighted input value to re-define the current cumulative test result value;
sensing a position of a brake transmission shift interlock of the vehicle;
initiating a full test when the brake transmission shift interlock is disposed in a park gear;
sensing a depressed position of an accelerator pedal;
sensing a speed of the vehicle;
weighting the calculated position difference to define a full test weighted input value when the full test counter is greater than a initiated full test value, the brake transmission shift interlock is moved out of the park gear, the speed of the vehicle is less than a pre-defined vehicle speed and the depressed position of the accelerator pedal is less than a pre-defined accelerator pedal position;
incrementing the current cumulative test result value by the full test weighted input value to re-define the current cumulative test result value; and
tracking a moving average of the current cumulative test result value to determine if the brake pedal position sensor is functioning properly.

16. A method as set forth in claim 15 further comprising signaling that the brake pedal position sensor is functioning properly when the moving average of the weighted input is greater than a passing level.

17. A method as set forth in claim 15 further comprising signaling that the brake pedal position sensor is not functioning properly when the moving average of the weighted input is less than a failing level.

18. A method as set forth in claim 15 further comprising signaling that proper functionality of the brake pedal position sensor is undeterminable when the moving average of the weighted input is less than a passing level and greater than a failing level.

19. A method as set forth in claim 15 wherein initiating the full test buffer when the brake transmission shift interlock is disposed in a park gear occurs only once during a vehicle on cycle.

* * * * *